H. P. KRAFT & M. C. SCHWEINERT.
PRESSURE INDICATOR.
APPLICATION FILED JULY 14, 1909.

1,176,907.

Patented Mar. 28, 1916.
3 SHEETS—SHEET 1.

WITNESSES:
Fred White
René Bruine

INVENTORS:
Henry P. Kraft and
Maximilian Charles Schweinert,
By their Attorneys,
Arthur E. Fraser & Usina H. P. KRAFT & M. C. SCHWEINERT.
PRESSURE INDICATOR.
APPLICATION FILED JULY 14, 1909.

1,176,907.

Patented Mar. 28, 1916.
3 SHEETS—SHEET 2.

WITNESSES:

INVENTORS:
Henry P. Kraft and
Maximilian Charles Schweinert
By Attorneys,

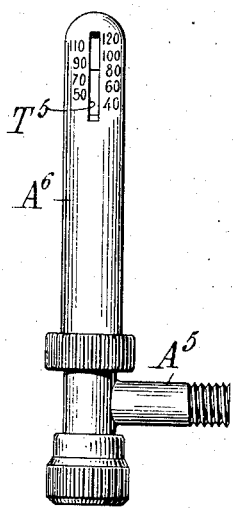
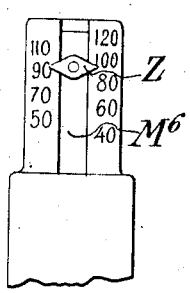
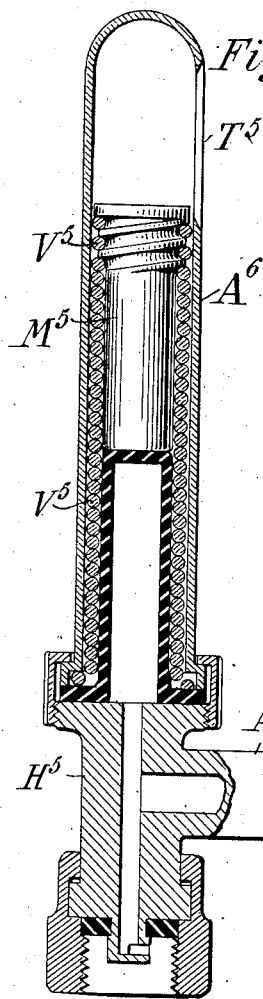
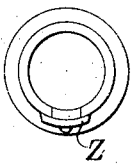
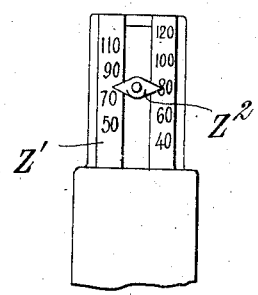
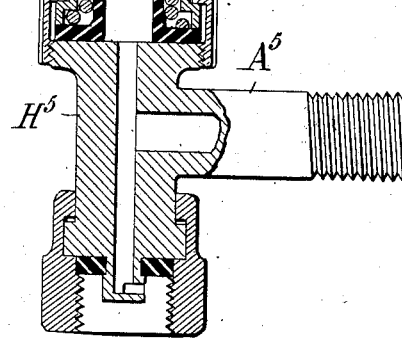
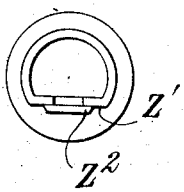

UNITED STATES PATENT OFFICE.

HENRY P. KRAFT, OF NEW YORK, N. Y., AND MAXIMILIAN CHARLES SCHWEINERT, OF WEST HOBOKEN, NEW JERSEY.

PRESSURE-INDICATOR.

1,176,907.   Specification of Letters Patent.   Patented Mar. 28, 1916.

Application filed July 14, 1909. Serial No. 507,565.

*To all whom it may concern:*

Be it known that we, HENRY P. KRAFT, residing in the borough of Brooklyn, county of Kings, city and State of New York, and MAXIMILIAN CHARLES SCHWEINERT, residing in West Hoboken, in the county of Hudson and State of New Jersey, both citizens of the United States, have invented certain new and useful Improvements in Pressure-Indicators, of which the following is a specification.

This invention relates to pressure indicators, and is especially adapted for indicating the pressures in pneumatic tires or other similar devices.

According to our invention we provide a pressure indicator which in its preferred form is adapted to be applied directly to a pneumatic tire valve of any standard construction, or to an intermediate pump connection which itself is applied to a valve, so that the pressures within the tire are indicated during the act of inflation.

In the most complete form of the invention, means are provided not only for indicating the pressures within the tire, but also for relieving the pressure when the latter rises to a predetermined height, so that it is impossible to pump into the tire any greater pressure than that indicated. In a simpler form of the device the relieving or deflating mechanism is omitted, and the device acts only as an indicator.

Various other features of improvement will be hereinafter pointed out.

Figure 1:
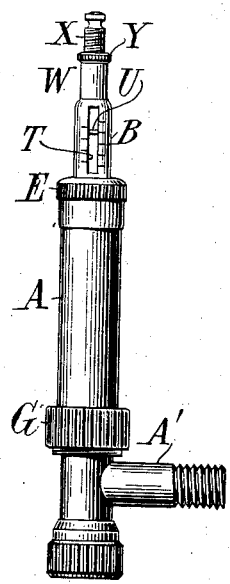
Figure 3:
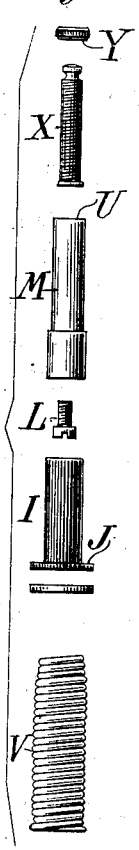
Figure 2:
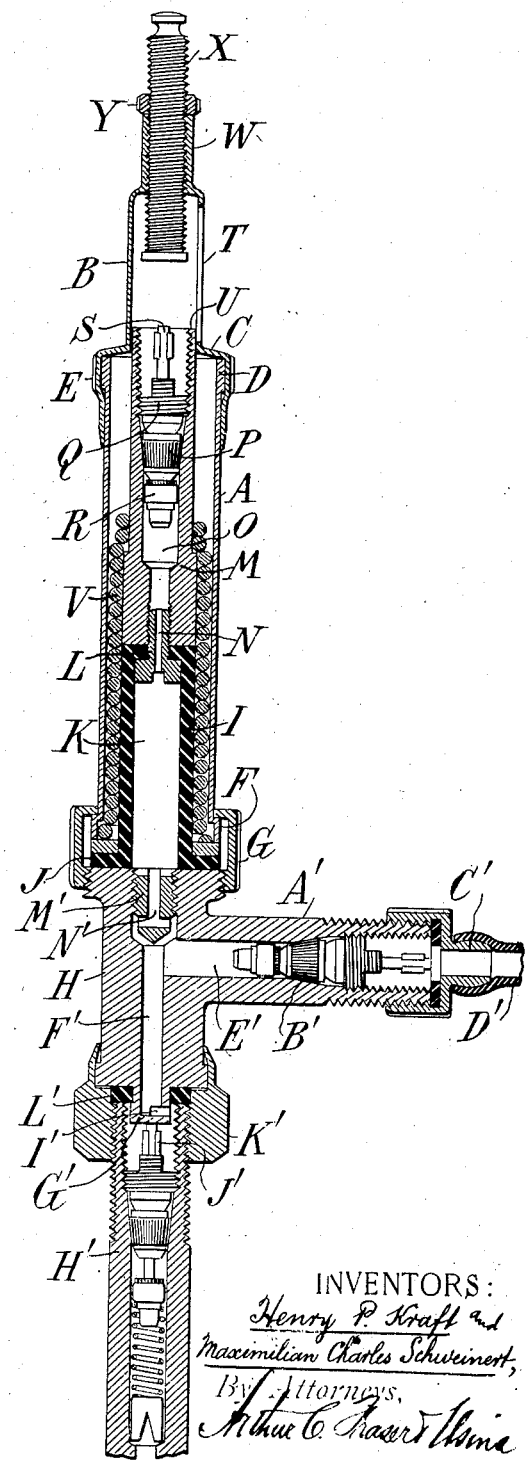
Figure 4:
Figure 6:
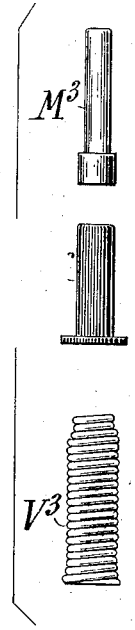
Figure 5:
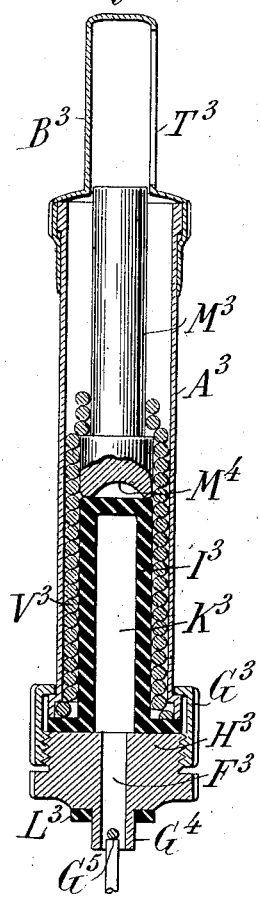

Referring to the drawings, which illustrate several forms of the invention, Figure 1 is an elevation of the complete indicator and pressure relief mechanism adapted for attachment to a pump and a tire valve; Fig. 2 is a diametral section of the device of Fig. 1 on a larger scale; Fig. 3 is a view showing various parts of Fig. 1 in elevation; Fig. 4 is a view of another form of the invention adapted to act as a pressure indicator only, and also adapted to be inserted directly in the top of a tire valve to determine the pressure therein without the intervention of a pump coupling; Fig. 5 is a diametral section of Fig. 4 on a larger scale; Fig. 6 is an elevation of the several parts of the indicator detached; Fig. 7 is a view of another modification in which the deflating or relief mechanism is omitted; Fig. 8 is a diametral section of Fig. 7 on a larger scale; Fig. 9 is a view of a modified form of indicating hand or pointer; Fig. 10 is a plan of Fig. 9; Fig. 11 is still another modification; and Fig. 12 is a plan of Fig. 11.

Referring first to Figs. 1 to 3 of the drawings let A indicate a suitable casing having swiveled to its upper end an extension B, such extension having a flange C adapted to fit over a flange D formed on the casing A. The flange C is preferably provided with a knurled portion E by means of which the extension B may be easily rotated for a purpose hereinafter described. At its lower end the casing A is formed with a flange F designed to be engaged by a coupling G, so that the casing may be secured to a pump connection H or other member.

Within the lower part of the casing A is located an expansible tube I preferably formed of rubber, the lower end of which is provided with a flange J by which it may be fastened at the lower part of the casing, preferably by being squeezed against the pump connection H or other device by the coupling G, so that a tight connection is made at this point. The tube I which is in the form of a thimble, that is to say, is closed or partly closed at one end, forms on its interior an expansion chamber K within which the air, which is to be measured as to its pressure, is admitted in any suitable way. The upper end of the thimble I in these figures is partly closed, it being perforated only sufficiently to permit the passage of a screw L, by which the thimble is connected to an indicating member M, the screw having a passage N in the construction shown by which air is admitted to a valve chamber O formed in the indicating member M. Mounted in the valve chamber O is a valve seat P held in place by a screw plug Q, and co-acting with such seat is a valve proper R connected with a stem S. These parts are preferably of the usual Schrader valve type, although there may be many suitable constructions.

When there is air under pressure in the chamber K this is communicated through the bore or opening N in the screw L, and thence to the valve chamber O, forcing the valve proper R to its seat. Under these conditions the pressure within the chamber K will extend the tube or thimble I and raise the indicating member M to a greater or less extent depending upon the degree of pressure. Any suitable means for indicating the movements of the member M may be adopted. We prefer, however, to provide the extension B with a slot or opening T through which may be observed the top edge U of the member M. The extension B may be formed of suitable graduations or other indicating marks as illustrated in Fig. 1.

While the resistance of the thimble or tube I may in some cases be utilized for opposing the pressure, we prefer to augment this by a spring V, the lower end of which is expended as shown to engage the lower end of the casing A while the upper end is contracted to engage a reduced portion of the indicating member M. By this means the spring constitutes a load which increases with the pressure. The spring also performs an important function in connection with the tube I. If the spring were omitted, there would be liability of the tube expanding laterally under the pressure so that it would rub against the inner sides of the casing, and be liable to other deformations. The tube prevents this expansion and constitutes a protecting expansible and contractible casing or shell for the tube. An important feature in this connection is the proportioning of the spring V. If this spring were only as long as the tube, the convolutions of the spring would separate to such an extent during the maximum expansion of the tube as to minimize the protecting effect of the spring. We hence make the effective length of the spring considerably longer than the tube, as shown in Fig. 2 wherein the spring is effective from its point of connection with the reduced part of the indicating member M to its point of connection with the flange F of the casing A. By this means the spring places a sufficient load upon the movements of the indicating member M to secure a proper indication of the pressures, while at the same time the convolutions of the spring separate to so small an extent in use that the tube or thimble is adequately protected, and does not to any material extent force its way between such convolutions.

According to our invention we prefer to provide means whereby when a predetermined or set pressure is reached no further substantial increase of pressure within the tire is permitted. The mechanism provided for that purpose in the present construction is shown best in Fig. 2. In this figure the extension B is provided with a reduced portion W which is screw-threaded on its interior, and a plunger or gage X is screwed in said extension, a lock nut Y being preferably provided to hold the plunger in its adjusted positions. To set the device the lock-nut Y is loosened, and the plunger screwed in until its lower end is opposite whatever pressure is desired on the indicating scale of the extension B. The lock nut is then turned to clamp the parts. As the indicating member M rises under the pressure, the stem S of the valve R engages the lower end of the plunger X, and a slight further movement pushes the valve R from its seat, permitting the escape of air from the valve chamber O and expansion chamber K. Under these conditions when our device is combined with a pump connection, the incoming air from the pump instead of flowing to the tire passes through the chambers K and O into the extension B and thence through the opening T to the outer air.

In Fig. 2 we have illustrated the invention as combined with the pump connection H. This pump connection consists of a plug having a lateral arm A' within which is mounted a suitable valve mechanism B', while there is screwed to the end of the connection A' a nipple member C' adapted to be connected with the rubber pump tube D'. The extension A' has a bore E' leading to the vertical bore F' of the connection, which latter is extended downwardly into a projection G' designed to enter the top of a tire valve shell H'. The projection G' is preferably imperforate on its lower side but a lateral opening I' is provided through which the air passes into the tire valve. The function of the imperforate lower wall I' is to press down the stem J' of the tire valve, so that during the pumping operation the tire valve is held in its open position. The purpose of this construction is to provide a free connection for the air between the tire and the chamber K through the bore F'. In use with a pump the valve B' of the lateral extension A' serves as a check valve to prevent the back flow of air into the pump. The lower end of the extension H is preferably provided with a coupling K' swiveled thereto, and adapted to screw on the end of the tire valve shell while a packing L' is fitted around the projection G' to make a tight joint with the valve shell.

In order to avoid jumping or pulsating of the part M, we preferably introduce into the pump connection or other suitable point a plug M' which has a T-shaped bore N' leading at right angles into the central bore F' of the part H. By this construction the direct passage of air into the expansion chamber K is avoided it being necessary for the air to work itself around into the angular passage N'; when the air is being pumped into the device therefore its pulsating effect is broken up before it reaches the expansion chamber K.

In Figs. 4 to 6 we have shown a form of the device in which the deflating mechanism is omitted. In this form of the device the shell A³ is provided with an extension B³, and the indicating member M³ is constructed as a plunger, the lower face of which is concaved at M⁴. The tube I³ retains substantially the shape shown in Fig. 2 except that it is imperforate or closed at its upper end. The tube forms an expansion chamber K³ into which air from the tire or other device passes. In these figures we have also shown the device as applicable for use as an indicator without the pump connection. In this construction a plug H³ is provided to which the shell A³ is united by a coupling G³. The plug H³ is provided at its lower end with a nipple G⁴ and a passage F³ leading through the plug and nipple. A pin G⁵ extending across the nipple is provided for pressing down the deflating pin of the valve when the device is applied. As in Fig. 2 a spring V³ surrounds the tube to protect it, and to place a proper load upon the indicating member. In the use of this embodiment of the device it is necessary only to press the nipple G⁴ into the end of a valve shell until a tight joint is made by the packing washer L³, whereupon the deflating pin of the tire will be pressed inward, and the air from the tire will flow back through the valve into the expansion chamber K³.

In both of the constructions just described it is preferable to swivel the extension B³ to the casing A in order that the opening T (or T³) may be turned opposite the user no matter what the position of the indicator may be.

In Figs. 7 and 8 we have illustrated another embodiment of the invention wherein it is applied to a connection especially adapted for tanks or flasks as distinguished from pumps. For this purpose it is not necessary to provide a check valve in the lateral extension A⁵ of the connection H⁵. The extension A⁵ may be coupled up with the flask or tank of compressed air in any suitable way. In this construction we have shown the casing A⁶ as formed in one piece with a slot T⁵ at its top. The indicating member or plunger M⁵ moves upwardly and downwardly in the casing as before. The spring V⁵ is connected to the plunger near its top as shown, and to the casing at its bottom as illustrated in Figs. 2 and 5.

In either of the devices herein described the indicating means may be brought to the exterior of the casing or extension, if desired.

In Figs. 9 to 12 we have shown such a device which consists of a metal pointer Z fixed to the top of the plunger M⁶. Preferably the upper end of the casing or extension is flattened as shown at Z¹ (Figs. 11 and 12) in which case the pointer Z² will be flat as illustrated.

In any of the forms shown it is important that the extensible tube be constructed as a thimble, that is to say, with one end at least partially closed. In the construction of Figs. 1 to 3 it much facilitates connection with the plunger, and permits a leak-tight joint to be easily formed. In Figs. 4 to 8 this construction provides an absolutely secure and leak-tight packing for the plunger, so that escape of air is impossible, while also permitting the plunger and tube to be unconnected with each other, thus greatly simplifying the assembling and disassembling of the parts. It is also important that the tube be formed with a flange at its lower end as this much facilitates its connection with the casing or other part to which it is attached, and provides an easily made leak-tight joint at this point.

While we have shown and described certain embodiments of the invention, it is to be understood that we do not wish to be limited to the specific constructions shown, since various changes may be made therein without departing from the invention.

We do not herein claim specifically the forms illustrated in Figs. 1 to 3 and 7 to 12, as these form the subject-matter of a divisional application filed by us February 23, 1916, Serial No. 79,880.

What we claim is:—

1. A pressure gage comprising a tubular casing, a plunger head movable in the direction of length of said casing, said casing acting as a guide for said plunger head, means sliding along said casing for indicating the movements of said plunger head, an extension spring connected at its upper end to said plunger head and connected at its lower end to said tubular casing, and an elastic imperforate thimble fitting within said spring, the upper end of said thimble engaging the under side of said plunger head, and means for connecting the lower end of said thimble with a leak-tight joint to said casing, means at the lower end of said casing for connecting said gage to a tire-valve casing, and means at such lower end for unseating such check-valve.

2. A pressure gage comprising a tubular casing, a plunger head movable in the direction of length of said casing, said casing having a tubular member for guiding said plunger head, an extension spring connected at its upper end to said plunger head and connected at its lower end to said tubular casing, and an elastic imperforate thimble fitting within said spring, the upper end of said thimble engaging the under side of said plunger head, and means for connecting the lower end of said thimble with a leak-tight joint to said casing, means at the lower end of said casing for connecting said gage to a tire-valve casing, and means at such lower end for unseating such check-valve.

3. A pressure gage comprising a tubular casing, a plunger head movable in the direction of length of said casing, said casing having a tubular member adapted to extend beyond said casing but held against lateral movement with relation to said casing, said tubular member acting as a guide for said plunger head, an extension spring connected at its upper end to said plunger head and connected at its lower end to said tubular casing, and an elastic imperforate thimble fitting within said spring, the upper end of said thimble engaging the under side of said plunger head, and means for connecting the lower end of said thimble with a leak-tight joint to said casing, means at the lower end of said casing for connecting said gage to a tire-valve casing, and means at such lower end for unseating such check-valve.

4. A pressure gage comprising a tubular casing, a plunger head movable in the direction of length of said casing, said casing having a swiveled longitudinally slotted extension in which said plunger head is movable, an extension spring connected at its upper end to said plunger head and connected at its lower end to said tubular casing, and an elastic imperforate thimble fitting within said spring, the upper end of said thimble engaging the under side of said plunger head, and means for connecting the lower end of said thimble with a leak-tight joint to said casing, means at the lower end of said casing for connecting said gage to a tire-valve casing, and means at such lower end for unseating such check-valve.

5. A pressure gage comprising a casing, a plunger-head, an extension spring, an elastic imperforate thimble fitting within said spring, means for connecting said spring and thimble to said casing, means for connecting said gage to a tire-valve casing, and means for unseating a check-valve, said casing comprising a straight tubular portion in which said plunger-head is longitudinally movable and guided, and of a length to contain said plunger when in extended position, said plunger head indicating degrees of pressure by its position in said tube.

6. A pressure gage comprising a casing, a plunger-head, an extension spring, an elastic imperforate thimble fitting within said spring, means for connecting said spring and thimble to said casing, means for connecting said gage to a tire valve casing, and means for unseating a check-valve, said casing comprising a straight tubular portion in which said plunger-head is longitudinally movable and guided, and of a length to contain said plunger when in extended position, said plunger head indicating degrees of pressure by its position in said tube, said tubular portion having a slot therein through which the positions of said plunger-head are observable.

7. A pressure gage comprising a casing, a plunger-head, an extension spring, an elastic imperforate thimble fitting within said spring, means for connecting said gage to a tire-valve casing, and means for unseating a check valve, said casing comprising a straight tubular portion, a base piece and a coupling adapted to connect said tubular portion and base piece, said spring and thimble being clamped at one end between said tubular portion and base piece, said plunger-head being longitudinally movable and guided in said tubular portion, said tubular member being of a length to contain said plunger-head when in extended position, said plunger-head indicating degrees of pressure by its position in said tube.

In witness whereof, we have hereunto signed our names in the presence of two subscribing witnesses.

HENRY P. KRAFT.
MAXIMILIAN CHARLES SCHWEINERT.

Witnesses:
THOMAS F. WALLACE,
FRED WHITE.